UNITED STATES PATENT OFFICE.

RUPERT GREVILLE WILLIAMS, OF ALBANY, NEW YORK.

ACTION OF SALTS OF TETRAZO-DITOLYL OR DIPHENYL ON DIHYDROXIDES OF TOLUENE OR THEIR SULPHO-ACIDS.

SPECIFICATION forming part of Letters Patent No. 394,425, dated December 11, 1888.

Application filed April 10, 1888. Serial No. 270,192. (No specimens.)

*To all whom it may concern:*

Be it known that I, RUPERT GREVILLE WILLIAMS, a subject of Her Majesty the Queen of Great Britain, and a resident of Albany, in the county of Albany and State of New York, have invented certain new and useful Improvements in the Manufacture of Coloring-Matter, of which the following is a specification.

My invention relates to the production of new coloring-matters obtained by the action of a salt of tetrazo-diphenyl or tetrazo-ditolyl, or the sulpho-acids of a salt of tetrazo-diphenyl or tetrazo-ditolyl on the dihydroxides of toluene, or the sulpho-acids of the same.

The following is an example of how I produce practically red coloring-matters which dye unmordanted cotton in an alkaline bath.

Twenty-eight pounds of benzidine sulphate or its equivalent of toluidine sulphate are suspended in a fine state of division in two hundred (200) pounds of water and twenty-five pounds of muriatic acid, 22° Baumé, are added. The mixture is then cooled with ice and fourteen (14) pounds of nitrite of soda dissolved in five times its weight of water are slowly run in. After the tetrazo compound is fully formed the solution is poured into twenty-eight and four-tenths (28.4) pounds of orcin and one hundred (100) pounds of acetate of soda and ten (10) pounds of caustic soda dissolved in one hundred gallons of water. The brown insoluble precipitate thus formed is filtered off after the lapse of fifteen hours, and when washed is converted into its soda salt in the usual manner.

The coloring-matters thus produced dye unmordanted cotton red in an alkaline or soap bath, and the colors are fast to soaping. They are insoluble in dilute acids and dissolve in strong sulphuric acid with a purple coloration.

What I claim as my invention, and desire to secure by Letters Patent, is—

As new coloring-matters of the character hereinbefore described, the products which are formed by the action of a salt of tetrazo-diphenyl or tetrazo-ditolyl, or the sulpho-acids of a salt of tetrazo-diphenyl or tetrazo-ditolyl on the dihydroxides of toluene, or the sulpho-acids of the same, substantially as set forth.

RUPERT GREVILLE WILLIAMS.

Witnesses:
F. V. M. HUDSON,
JOHN J. VAN SCHOONHOVEN.